(12) United States Patent
Eryazici et al.

(10) Patent No.: US 10,100,377 B2
(45) Date of Patent: Oct. 16, 2018

(54) AQUEOUS MULTI-STAGE COPOLYMER COMPOSITIONS FOR USE IN LEATHER TOPCOATS

(71) Applicant: Rohm and Haas Company, Philadelphia, PA (US)

(72) Inventors: Ibrahim Eryazici, Limerick, PA (US); Bradley K. Hageman, Pottstown, PA (US); Joseph M. Hoefler, Perkiomenville, PA (US); Edwin Nungesser, Horsham, PA (US)

(73) Assignee: Rohm and Haas Company, Philadelphia, PA (US)

(*) Notice: Subject to any disclaimer, the term of this patent is extended or adjusted under 35 U.S.C. 154(b) by 120 days.

(21) Appl. No.: 15/246,583

(22) Filed: Aug. 25, 2016

(65) Prior Publication Data

US 2017/0058371 A1    Mar. 2, 2017

Related U.S. Application Data

(60) Provisional application No. 62/212,048, filed on Aug. 31, 2015.

(51) Int. Cl.

| | |
|---|---|
| *C14C 11/00* | (2006.01) |
| *C09D 133/14* | (2006.01) |
| *C09D 175/04* | (2006.01) |
| *C09D 175/06* | (2006.01) |
| *C09D 175/08* | (2006.01) |
| *C09D 133/08* | (2006.01) |
| *C08G 18/62* | (2006.01) |
| *C08F 265/06* | (2006.01) |
| *C09D 133/00* | (2006.01) |
| *C08G 18/08* | (2006.01) |
| *C09D 151/06* | (2006.01) |
| *C08F 220/18* | (2006.01) |

(52) U.S. Cl.
CPC .......... *C14C 11/003* (2013.01); *C08F 265/06* (2013.01); *C08G 18/0823* (2013.01); *C08G 18/6254* (2013.01); *C09D 133/00* (2013.01); *C09D 133/08* (2013.01); *C09D 133/14* (2013.01); *C09D 151/06* (2013.01); *C09D 175/04* (2013.01); *C14C 11/006* (2013.01); *C08F 220/18* (2013.01)

(58) Field of Classification Search
CPC ... C14C 11/003; C14C 11/006; C09D 133/14; C09D 175/04; C09D 175/06; C09D 175/08

USPC .......................................... 428/473; 525/92 C
See application file for complete search history.

(56) References Cited

U.S. PATENT DOCUMENTS

| | | | |
|---|---|---|---|
| 4,325,856 A | 4/1982 | Ishikawa et al. | |
| 4,654,397 A | 3/1987 | Mueller-Mall et al. | |
| 4,814,373 A | 3/1989 | Frankel et al. | |
| 5,185,387 A | 2/1993 | Klesse et al. | |
| 5,328,952 A * | 7/1994 | Brodnyan | C04B 24/2641 |
| | | | 525/301 |
| 6,153,690 A | 11/2000 | Larson et al. | |
| 6,376,575 B2 | 4/2002 | Buter et al. | |
| 8,492,477 B2 | 7/2013 | Cauvin et al. | |
| 2004/0221395 A1 | 11/2004 | Biver et al. | |
| 2014/0162073 A1 * | 6/2014 | Grzesiak | D06N 3/147 |
| | | | 428/422.8 |

FOREIGN PATENT DOCUMENTS

| | | | |
|---|---|---|---|
| EP | 1274794 A1 | 1/2003 | |
| EP | 1484418 A1 | 12/2004 | |
| WO | WO-1994004581 A1 | 3/1994 | |
| WO | WO-2015118158 A1 * | 8/2015 | ........... C09D 201/00 |

OTHER PUBLICATIONS

Hageman et al "Improvements in Gakushin Wear Testing Through Laboratory Automation"; Journal of American Leather Chemists Association; 2013; vol. 108, Issue 6; pp. 200-209.

* cited by examiner

*Primary Examiner* — Ramsey E Zacharia
(74) *Attorney, Agent, or Firm* — Kari E. Stauss; Cantor Colburn LLP

(57) ABSTRACT

The present invention provides aqueous composition comprising a multi-stage acrylic emulsion polymer having a first stage polymer of from 0.5 to 4 wt. %, based on the total weight of monomers used to make the first stage polymer, of a copolymerized carboxylic acid or salt group containing monomer, and having 10 to 30 wt. %, on total solids of the multi-stage acrylic emulsion polymer, of a second stage polymer of from 3 to 15 wt. % of a copolymerized hydroxyl group containing monomer, the first stage polymer having a glass transition temperature (Tg) by dynamic mechanical analysis (DMA) of less than $-10°$ C. and the second stage polymer having a Tg (DMA) of greater than $80°$ C.; and (ii) from 25 to 75 wt. %, based on the total solids weight of the multi-stage acrylic polymer, of a polyurethane.

14 Claims, No Drawings

AQUEOUS MULTI-STAGE COPOLYMER COMPOSITIONS FOR USE IN LEATHER TOPCOATS

The present invention relates to aqueous coating compositions comprising (i) one or more multi-stage acrylic emulsion polymers having a first stage polymer of from 0.5 to 4 wt. %, or, preferably, from 1 to 3 wt. %, based on the total weight of monomers used to make the first stage polymer, of a copolymerized carboxylic acid or salt group containing monomer, and having 10 to 30 wt. %, based on the total solids weight of the multi-stage acrylic emulsion polymer, of a second stage polymer of from 3 to 15 wt. %, based on the total weight of monomers used to make the second stage polymer, of a copolymerized hydroxyl group containing monomer, preferably, hydroxyethyl methacrylate, or, preferably, wherein the second stage polymer is substantially free of copolymerized carboxylic acid or salt group containing monomers and diethylenically or polyethylenically unsaturated vinyl monomer, wherein the first stage polymer having a glass transition temperature (Tg) by dynamic mechanical analysis (DMA) of less than −10° C. and the second stage polymer having a Tg (DMA) of greater than 80° C., and (ii) one or more polyurethanes, e.g. as a polyurethane dispersion, and to the coated articles made therefrom, as well as to leather topcoats made therefrom.

Leather upholstery has very demanding performance expectations for abrasion resistance, pigment fastness and substrate flexibility. However, leather upholstery is finished with topcoat compositions that contain polymers that are very soft to maintain the appearance, softness and other aesthetic attributes of the upholstery. To meet all of these requirements at once, the topcoat compositions contain high levels of polyurethane dispersions, which are relatively expensive and perform well. The topcoat compositions that comprise blends of soft acrylic polymer with the polyurethane polymer to minimize cost exhibit compromised performance. There remains a need for a composition for use in making leather topcoats that maintains the performance of the leather article while lowering the cost of the topcoat compositions.

In U.S. patent application 2004/0221395, to Biver et al. discloses an aqueous multi-stage polymer composition for leather treatment comprising one or more soft phase (glass transition temperature or Tg of <20° C.) and one or more hard phase (Tg>60° C.). However, the compositions in the reference fail to provide optimal abrasion resistance in combination with a polyurethane.

The present inventors have endeavored to provide compositions for making leather topcoats that comprise acrylic emulsion polymers and polyurethane and give one or all of improved abrasion resistance, pigment fastness and substrate flexibility.

STATEMENT OF THE INVENTION

1. In accordance with the present invention, aqueous compositions comprising (i) from 10 to 50 wt. %, or, preferably, from 15 to 30 based on the total solids weight of the composition, of one or more multi-stage acrylic emulsion polymer having 70 to 90 wt. %, or, preferably, from 70 to 83 wt. %, based on the total solids weight of polymer, of a first stage polymer of from 0.5 to 4 wt. %, or, preferably, from 1 to 3 wt. %, based on the total weight of monomers used to make the first stage polymer, of a copolymerized carboxylic acid or salt group containing monomer, and having 10 to 30 wt. %, or, preferably, from 17 to 30 wt. %, based on the total solids weight of the multi-stage acrylic emulsion polymer, of a second stage polymer of from 3 to 15 wt. %, based on the total weight of monomers used to make the second stage polymer, of a copolymerized hydroxyl group containing monomer, preferably, hydroxyethyl methacrylate, the first stage polymer having a glass transition temperature (Tg) by dynamic mechanical analysis (DMA) of less than −10° C. and the second stage polymer having a Tg (DMA) of greater than 80° C., or, preferably, greater than 100° C.; and (ii) from 25 to 75 wt. %, based on the total solids weight of the multi-stage acrylic polymer, of a polyurethane having a polymeric Tg determined by differential scanning calorimetry (DSC), scanning from a temperature of −90° C. to 150° C. at a heating rate of 20° C./min, of less than −20° C. or as low as −70° C., preferably less than −30° C., or, more preferably less than −40° C.

2. In accordance with the aqueous compositions of the present invention in 1, above, wherein the first stage polymer of the (i) multi-stage acrylic emulsion polymer is substantially free of copolymerized hydroxyl group containing monomers and is substantially free of copolymerized diethylenically or polyethylenically unsaturated vinyl monomers, having less than 0.1 wt. % of the copolymerized hydroxyl group containing monomer and less than 0.1 wt. % of diethylenically or polyethylenically unsaturated vinyl monomers, based on the total weight of monomers used to make the first stage polymer.

3. In accordance with the aqueous compositions of the present invention in any of 1 or 2, above, wherein the second stage polymer of the (i) multi-stage acrylic emulsion polymer is substantially free of copolymerized carboxylic acid or salt group containing monomers and is substantially free of copolymerized diethylenically or polyethylenically unsaturated vinyl monomers, having less than 0.1 wt. % of the copolymerized carboxylic acid or salt group containing monomers and less than 0.1 wt. % of diethylenically or polyethylenically unsaturated vinyl monomers, based on the total weight of monomers used to make the second stage polymer.

4. In accordance with the aqueous compositions of the present invention in any of 1, 2, or 3, above, wherein the first stage polymer of the (i) multi-stage acrylic emulsion polymer has a Tg (DMA) that is at least 100° C. less than the Tg of the second stage polymer, preferably, at least 120° C. less than the Tg (DMA) of the second stage polymer.

5. In accordance with the aqueous compositions of the present invention in any of 1, 2, 3, or 4, above, wherein at least one polyurethane in the (ii) polyurethane dispersion comprises a condensate of one or more polyester polyol or polyether polyol or polycarbonate polyol with a diisocyanate or a polyisocyanate, or, preferably, a polyester polyol or polycarbonate polyol with a diisocyanate or a polyisocyanate.

6. In accordance with the aqueous compositions of the present invention in any of 1, 2, 3, 4, or 5, above, further comprising (iii) from 1 to 50 wt. %, or, preferably, from 6 to 22 wt. % or, more preferably, from 10 to 16% of a polyorganosiloxane composition, based on the total solids weight of the composition, such as a polydiorganosiloxane polymer, for example, polydimethylsiloxane or polymethylphenylsiloxane, the polyorganosiloxane composition having a polyorganosiloxane with a weight average particle size of from 1.0 to 10 μm or, preferably, from 2 to 9 μm, or, more preferably, from 2 to 6 μm.

7. In accordance with the aqueous compositions of the present invention in 6, above, wherein the polyorganosiloxane composition further comprises one or more nonionic surfactants.

8. In accordance with the aqueous compositions of the present invention in 6 or 7, above, wherein the (iii) polyorganosiloxane composition as a neat polysiloxane polymer has a dynamic viscosity using a rheometer at a frequency of 0.01 Hz at 25° C. and standard pressure, of from 1,000 to 150,000 Pascal·seconds, or, preferably, from 5,000 to 90,000 Pascal·seconds.

9. In accordance with the aqueous compositions of the present invention in any of 1 to 8, above, further comprising (iv) up to 60 wt. %, or, preferably, from 10 to 20 wt. %, or, more preferably, from 5 to 15 wt. %, based on the total solids weight of the composition of one or more acrylic or vinyl crosslinked duller bead, preferably, a multi-stage acrylic copolymer bead, or, more preferably, multi-stage acrylic copolymer bead having a gradient refractive index, wherein the bead has a weight average particle size of from 1 to 20 μm, or, preferably, from 4 to 10 μm.

10. In another aspect of the present invention, coated articles comprise a substrate having thereon a coating of the aqueous compositions as in any of 1, 2, 3, 4, 5, 6, 7, 8, or 9, above.

11. In accordance with the coated articles of the present invention as in 10, above, the substrate comprises leather, such as leather upholstery, for example, automotive upholstery.

As used herein, the phrase "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, the phrase "aqueous" shall mean water or water mixed with 50 wt. % or less, based on the weight of the mixture, of water-miscible solvent.

As used herein, the phrase "weight average particle size" or "weight average particle size (BI-90)" of any of a polyurethane polymer, or any acrylic emulsion polymer, such as a multi-stage acrylic emulsion polymer, refers to the weight average particle size of a distribution of particles as determined by electrical impedance using a BI-90 Multisizer™ 3 Coulter Counter (Beckman Coulter, Inc., Fullerton, Calif.), per manufacturer's recommended procedures.

As used herein, the phrase "weight average particle size" or "weight average particle size (Mastersizer)" of any polyorganosiloxane composition refers to the weight average particle size of a distribution of particles as determined using a Malvern Mastersizer™ 3000 (Malvern Instruments, Ltd., Malvern, UK), per manufacturer's recommended procedures.

As used herein, the phrase "weight average particle size" or "weight average particle size (DCP)" of any duller beads or crosslinked duller beads having diameters of from 1 μm to 20 μm refers to the weight average particle size as measured using a Disc Centrifuge Photosedimentometer ("DCP") (CPS Instruments, Inc., Prairieville, La.) that separates modes by centrifugation and sedimentation through a sucrose gradient. The samples were prepared by adding 1 to 2 drops into 10 cc deionized (DI) water containing 0.1% sodium lauryl sulfate. 0.1 cc of the sample was injected into the spinning disc filled with 15 cc. sucrose gradient. Samples were analyzed relative to polystyrene calibration standards. Specific conditions were: sucrose gradient 2-8%; disc speed 10,000 rpm; calibration standard was 895 nm diameter polystyrene.

As used herein, the phrase "60° Gloss" refers to the gloss of a coated article or coating, measured at a 60° viewing angle using a Micro-TRI Gloss™ meter (BYK-Gardner GmbH, Geretsried, DE).

As used herein, the phrase "carboxylic acid or salt" means the subject carboxylic acid in its acid form or its salt form, i.e. carboxylate.

As used herein, the phrase "compatible" shall mean that a component or polymer itself is capable of forming a homogeneous blend with another component or polymer.

As used herein, the phrase "copolymer" shall mean copolymers, terpolymers, tetrapolymers, pentapolymers or hexapolymers, and also to random, block and graft copolymers.

As used herein, unless otherwise indicated, the phrase "dynamic viscosity" refers to the viscosity of a dried polysiloxane composition extracted from 5 grams of a 60 wt. % polysiloxane aqueous emulsion by mixing with 15 grams of ethanol in a vial, shaking the vial for 5 minutes, removing the clear ethanol layer on the top and leaving a polymeric mass; adding 15 grams of ethanol to the polymeric mass, breaking the polymeric mass apart and mixing with a stirring rod for 5 minutes, again decanting the clear layer from the vial; spreading the polymeric mass across the bottom of an aluminum weighing dish and drying it in an oven for 24 hours at 70° C. The dynamic viscosity of the dried polymer was measured with a rheometer (Rheometrics Mechanical Spectrometer RMS-800 Piscataway, N.J.) using a frequency sweep of from $10^2$ to $10^{-2}$ radians/second. The viscosity was measured at a frequency of 0.01 Hz at a temperature of 25° C.

As used herein, the phrase "polymeric duller" means a duller that forms a coating film when combined with a film forming binder component at a weight ratio of duller particles to binder of at least 4:1 applied to a substrate and dried at 150° C. or below.

As used herein, the phrase "low Tg monomer" shall mean any monomer, a homopolymer of which with a weight average molecular weight of 100,000 will have a Tg of 20° C. or below.

As used herein, unless otherwise indicated, the phrase "weight average molecular weight" or "Mw" refers to the weight average molecular weight of a polymer as measured by gel permeation chromatography (GPC), for acrylic polymers against polystyrene calibration standards using THF and an organic carboxylic acid as the mobile phase and diluent, and, for polyurethane polymers, against polystyrene calibration standards using THF as the mobile phase and diluent.

As used herein, the phrase "non-tacky" shall refer to compositions which, when applied and dried to form a film are not sticky to the touch.

As used herein, the phrase "nonionic monomer" means a copolymerized monomer residue that does not bear an ionic charge at a pH of from 2 to 13.

As used herein, the phrase "polymer" shall include resins and copolymers.

As used herein, the phrase "resin" shall include polymers and copolymers.

As used herein, the phrase "substantially free of" anything, such as copolymerized hydroxyl group containing monomers or diethylenically or polyethylenically unsaturated vinyl monomers refers to a composition in which none of the thing is added to the composition or is used in the making of the composition.

As used herein, unless otherwise indicated, the phrase "$T_g$" shall mean glass transition temperature measured by dynamic mechanical analysis (DMA) in which the indicated multi-stage acrylic aqueous emulsion polymer was dried in a polytetrafluoroethylene (PTFE) Petrie dish for 48 hr. The resulting films in the Petrie Dish were inverted and allowed to further dry for 24 hours; and the dishes were then dried for eight hours at 40° C. and placed in a vacuum oven until use. The resulting polymer films were tested in shear on a Rheometrics Mechanical Spectrometer (RMS-800) (TA Instruments, in Piscataway, N.J.) using 8 mm diameter disposable plate fixtures. The films were tested at a temperature of from 150° C. to −100° C. at a cooling rate of 3° C./min using the Dynamic Temperature Ramp Mode. The applied frequency was 6.28 rad/s (1 Hz) and both AutoTension and AutoStrain options were employed during the test. The initial nominal applied strain was 0.25%. The dynamic storage and loss moduli (G' and G" respectively) as well as tan δ were recorded as a function of temperature. The temperature at the peak maxima in the tan δ curve was recorded as the glass transition temperatures (Tg). In the case of a multi-stage polymer, the reported Tg values shall be the peak maxima of each distinct peak in tan δ curve in the DMA.

As used herein, the phrase "total solids" refers to any material, such as resin, polymer, pigment, additive, which does not volatilize under ambient temperature and standard pressure conditions. Water, volatile solvents or volatile organic compounds and ammonia are not considered solids.

As used herein, the phrase "vinyl" or "vinyl monomer" shall mean acrylic, vinyl ester, vinyl ether, monovinyl aromatic compounds, such as styrene and α-methyl styrene, and vinyl halides.

As used herein, the phrase "wt. %" shall mean percent by weight.

All ranges recited are inclusive and combinable. For example, an average diameter of 1 μm or more, or 2 μm or more, or 4 μm or more and up to 20 μm, or up 15 μm, will include ranges of 1 μm or more to 20 μm or less, 1 μm or more to 15 μm or less, 2 μm or more to 15 μm or less, 2 μm or more to 20 μm or less, 4 μm or more to 15 μm or less, and 4 μm or more to 20 μm or less.

Unless otherwise indicated, all temperature and pressure units are standard temperature and pressure (STP).

All phrases comprising parenthesis denote either or both of the included parenthetical matter and its absence. For example, the phrase "(co)polymer" includes, in the alternative, polymer, copolymer and mixtures thereof.

The aqueous compositions of the present invention enable the provision of coatings, such as leather topcoats, having good film properties approaching the quality of polyurethanes with compositions that comprise 25 to 75 wt. %, based on the total of acrylic emulsion polymer and polyurethane. Such compositions can comprise a majority of binder as acrylic emulsion polymer. Film properties achieved include at least two among flexibility, rub fastness, burnish resistance and print characteristics upon embossing.

Suitable binders of the present invention comprise one or more (i) aqueous multi-stage acrylic emulsion polymers comprising a first stage polymer and a second stage polymer. Both the first and second stage polymers including at least one copolymerized monoethylenically unsaturated nonionic monomer.

The one or more (i) multi-stage acrylic emulsion polymers may comprise the emulsion polymerization reaction product of acrylic monomers with copolymerizable vinyl monomers, such as styrene, allyl ethers, vinyl ethers, or vinyl esters like vinyl acetate.

To improve softness in coatings made therefrom, the first stage polymer has a Tg of less than −10° C.

To improve softness, the second stage polymer may be formed in the presence of up to 15 wt. % or, preferably, from 3 to 12 wt. %, or, more preferably, from 3 to 10 wt. %, based on the total solids weight of the monomers used to make the second stage polymer, of one or more chain transfer agent. The amount of chain transfer agent excludes any amounts consumed prior to forming the second stage polymer.

Preferably, the second stage polymer of the present invention comprises greater than 90 wt. % of monomers, based on the total solids weight of the monomers used to make the second stage polymer which would give a homopolymer of a 100,000 weight average molecular weight having a Tg of 30° C. or greater.

Preferably the weight average molecular weight of the multi-stage acrylic emulsion polymer is from 10,000 to 10,000,000, or, preferably, from 50,000 to 1,000,000, or, most preferably, greater than 100,000.

Preferably, the copolymerized hydroxyl group containing monomer in the second stage polymer is equal to or less than 3 wt. % of the total solids weight of monomers used to make the multi-stage acrylic emulsion polymer.

The one or more (i) multi-stage acrylic emulsion polymer take the form of particles having an average diameter of 30-1000 nm, or 50 nm or more, 100 nm or more, or 300 nm or more. For leather applications, the polymers in the emulsions take the form of particles having an average diameter of 30 to 500 nm, preferably 50 or more nm, or, preferably, up to 300 nm.

Suitable acrylic emulsion polymers for use as the leather coating applications may comprise the copolymerization reaction product of from 60 to 99 wt. % of low Tg monomers with the 0.5 to 4 wt. %, or, preferably, from 1 to 3 wt. %, of the one or more ethylenically unsaturated carboxylic acid or salt monomer, and the remainder of one or more (i) acrylic and/or (ii) copolymerizable ethylenically unsaturated monomer other than a low Tg monomer, all monomer proportions based on the solids weight of all monomers used to make the (co)polymer.

Suitable nonionic monomers include acrylic and vinyl nonionic monomers. Acrylic nonionic monomers may include, for example, one or more $C_{1-30}$ alkyl (meth)acrylate monomer, $C_{5-30}$ cycloalkyl (meth)acrylate, or $C_{5-30}$ (alkyl) aryl (meth)acrylate monomer, including, for example, methyl methacrylate, isodecyl methacrylate and the low Tg acrylic monomers. Suitable low Tg monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA). Vinyl nonionic monomers may include, for example, vinyl acetate or other vinyl esters; vinyl monomers, such as styrene or substituted styrenes, including α-methyl styrene, vinyl chloride, and vinylidene chloride.

Preferably, the first stage polymer of the (i) multi-stage acrylic emulsion (co)polymers comprise (co)polymers which are the polymerization product of monomers chosen from EA, BA, and 2-EHA.

Further, the multi-stage acrylic emulsion polymer of the present invention is preferably substantially free of a transition metal oxide, hydroxide, or carbonate.

In general, the (i) multi-stage acrylic emulsion (co)polymers and the (iv) crosslinked duller beads are formed by aqueous emulsion polymerization in the presence of an initiator, such as a thermal initiator like a peracid, e.g.

persulfate, or a peroxide, or a redox pair, such as a peracid or peroxide and a reducing agent like a bisulfite or an organic sulfoxylate. Such emulsion polymerization methods are conventional in the art and are described below in more detail.

For use in making the first stage polymer of the present invention, suitable copolymerizable monoethylenically-unsaturated carboxylic acid group containing monomers may include, for example, acrylic acid, methacrylic acid, crotonic acid, itaconic acid, fumaric acid, maleic acid, monomethyl itaconate, monomethyl fumarate, monobutyl fumarate, maleic anhydride, styrylic acid, and the anhydrides and salts thereof. Preferred carboxylic acid monomers are acrylic acid, (meth)acrylic acid, and itaconic acid. Such monomers confer water dispersibility to acrylic and vinyl emulsion polymer binders.

For use in making the second stage polymer of the present invention, suitable copolymerizable monoethylenically-unsaturated hydroxyl group containing monomers may include, for example, hydroxyalkyl acrylates, hydroxylalkyl methacrylates, and allyl alcohols, preferably, hydroxyethyl methacrylate.

For any stage of the (i) multi-stage acrylic emulsion (co)polymers, suitable copolymerizable ethylenically unsaturated monomers may include, for example, polar copolymerizable monoethylenically unsaturated monomers, functional copolymerizable monoethylenically unsaturated monomers, silicon or fluorine containing (meth)acrylates, conjugated dienes, such as butadiene; and vinyl monomers.

Suitable polar copolymerizable monoethylenically unsaturated monomers may include, for example, phosphoethyl (meth)acrylate, 2-(meth)acrylamido-2-methylpropane sulfonic acid (AMPS™, Lubrizol Corp., Wickliffe, Ohio), hydroxyethyl (meth)acrylate, hydroxypropyl (meth)acrylate, aminoalkyl (meth) acrylates, N-vinyl pyrollidinone, (meth)acrylamides, N-vinylimidazoles and cationic monomers such as (meth)acrylamidopropyl trimethylammonium chloride [(M)APTAC], and diallyldimethylammonium chloride (DADMAC).

Suitable functional copolymerizable monoethylenically unsaturated monomers may include, for example, monoethylenically unsaturated monomers containing an acetoacetate or acetoacetamide group, such as, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di (acetocacetoxy)propyl (meth)acrylate, vinyl acetoacetamide, and acetoacetoxyethyl (meth)acrylamideacetoacetoxyalkyl (meth)acrylates; diacetoneacrylamide, and monoethylenically unsaturated monomers containing nitrile group (meth)acrylonitrile, and are, preferably, acetoacetoxyethyl methacrylates (AAEM). Such monomers help to make acrylic and vinyl emulsion polymer binders more resistant to chemicals.

Preferably, the multi-stage aqueous emulsion polymers of the present invention are substantially free of or contain 0.1 wt. % or less, based on the total solids weight of monomers used to make the multi-stage acrylic emulsion polymer, of copolymerized diethylenically or polyethylenically unsaturated monomers.

The diethylenically or polyethylenically unsaturated vinyl monomers may be crosslinking monomers or graftlinking monomers.

Crosslinking monomers may be generally diethylenically or polyethylenically unsaturated vinyl monomers copolymerizable with acrylic or vinyl monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth) crylates, diallyl phthalate, and the like.

Graftlinking monomers generally are diethylenically or polyethylenically unsaturated vinyl monomers copolymerizable with acrylic or vinyl monomers and having sufficiently low reactivity of the unsaturated groups to allow significant residual unsaturation to remain in a polymer, such as a first stage polymer subsequent to its polymerization, such as, for example allyl methacrylate (ALMA), allyl acrylate, diallyl maleate, allyl acryloxypropionate and the like. The preferred graftlinking monomer is ALMA.

The (iv) crosslinked duller beads of the present invention lower the gloss of coatings made therefrom. Such crosslinked duller beads comprise particles having an average diameter of 1-20 μm of one or more polymer chosen from a multi-stage copolymer, a single stage crosslinked (co)polymer having a Tg of from −60° C. to 75° C., and mixtures thereof.

Suitable crosslinked duller beads may include, for example, polymers chosen from single staged polymers, such as crosslinked t-butyl acrylate (t-BA) (co)polymer, crosslinked 2-ethylhexyl (meth)acrylate (co)polymer, crosslinked sec-butyl (meth)acrylate (co)polymer, crosslinked ethyl (meth)acrylate (co)polymer, crosslinked methyl acrylate (co)polymer, crosslinked n-butyl (meth)acrylate (co) polymer, crosslinked $C_{21}$ to $C_{30}$ alkyl (meth)acrylates, crosslinked vinyl propionate (co)polymer, a copolymer of any of the crosslinked polymers with an acrylic monomer the copolymer having a Tg of from −10° C. to 75° C., a copolymer of any of the crosslinked polymers with a vinyl monomer the copolymer having a Tg of from −10° C. to 75° C.; multi-stage polymers, such as acrylic multi-stage polymers or vinyl multi-stage polymers; as well as mixtures and combinations thereof.

Preferably, the crosslinked duller beads comprise acrylic multi-stage polymers.

The (iv) crosslinked duller beads of the present invention may be formed from the same nonionic monomers, and the same diethylenically or polyethylenically unsaturated vinyl monomers as the (i) multi-stage acrylic emulsion polymers of the present invention. The crosslinked duller beads are the product of one or more crosslinking monomers.

Crosslinked duller beads comprise polymer particles having a weight average particle size of 1-20 μm. Suitable duller particles have a weight average particle size of 1 μm or more, preferably, 2 μm or more, or 4 μm or more, or 5 μm or more. When the weight average particle size of the particles is smaller than 1 μm, the particles tend to aggregate and become difficult to disperse adequately in the aqueous composition. Suitable duller particles may range up to 20 μm, or up to 15 μm, or, more preferably, up to 10 μm. If many crosslinked duller bead particles smaller than the desired size are present in the compositions, the matting efficiency of the duller decreases; if many crosslinked duller bead particles larger than the desired size are present in the compositions, the coating surface is less attractive and clarity decreases.

Preferably, the (iv) crosslinked duller beads of the present invention comprise multi-stage polymers with, for example, a core-shell or layered structure, such as a multilobal structure. Multi-stage duller particles comprise a polymeric core phase and one or more polymeric shell phase and can comprise a gradient or graded refractive index (grin) composition where each stage of the composition has a progressively increasing or decreasing refractive index. The core may be prepared from any nonionic acrylic or vinyl monomers polymerizable by free-radical initiation, e.g. methyl methacrylate, butyl methacrylate, phenyl methacrylate, ethyl acrylate, butyl acrylate, 2-ethylhexyl acrylate, and benzyl acrylate, and may be a rubbery or glassy polymer. The core may be prepared from polymerization or copolymerization of such monomers as diethylenically or polyethylenically unsaturated vinyl monomers.

Preferred (iv) crosslinked duller beads may comprise multi-stage acrylic polymers having rubbery cores, i.e. having a Tg of 20° C. or less, or 10° C. or less. In rubbery core polymers for the crosslinked duller beads, the preferred alkyl acrylate is t-BA or BA. In one example, a preferred two-stage 5 µm weight average diameter copolymer comprises rubbery poly(BA) crosslinked with allyl methacrylate and has a hard shell of poly methyl methacrylate (pMMA), the shell comprising 20 wt. % of the particle, based on the total solids weight of the monomers used to make the shell stage polymer.

For either or both of the (i) multi-stage acrylic emulsion polymers and the (iv) crosslinked duller beads of the present invention, polymerization techniques used to prepare aqueous emulsion-polymers and multi-stage emulsion polymers are well known in the art. The polymerization techniques used to prepare aqueous multi-stage emulsion polymers are known in the art such as, for example, U.S. Pat. Nos. 4,325,856, 4,654,397, and 4,814,373. In multi-stage polymerization processes, at least two stages differing in composition are formed in a sequential fashion and, unless otherwise specified, can be formed in any order.

In emulsion polymerization, monomer mixture(s) may be added neat or as an emulsion in water. One or more monomer mixture may be added in one or more additions and may be added continuously over all or part the reaction period or not continuously over all or part of the reaction period. One or more monomer mixture can be added linearly, such as in the case of gradual addition (grad add), or not, such as, for example, in semi-continuous polymerization or addition all at once as a "shot", or in any combination thereof. To make higher mw polymers, one or more monomer mixtures should be added as a "shot" to the reactor or initially charged in the reactor at the beginning of one or more reaction stage.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. The amount of surfactant used is usually 0.1% to 6% by weight, based on the weight of monomer. The same surfactants and amounts thereof are used in both single stage and in multi-stage emulsion polymerization processes.

Either thermal or redox initiation processes may be used in either single stage or multi-stage emulsion polymerization processes. Known free radical initiators may be used at a level of from 0.01 to 3.0 wt. %, based on the weight of total monomer, such as, for example, peroxides, ammonium and/or alkali persulfates. Redox systems using the same initiators may be used coupled with a suitable reductant such as, for example, (iso)ascorbic acid, alkali metal and ammonium salts of sulfur-containing acids, such as sodium sulfite, bisulfite, formadinesulfinic acid, hydroxymethanesulfonic acid, sodium sulfoxylate formaldehyde, 2-hydroxy-2-sulfinatoacetic acid, 2-hydroxy-2-sulfonatoacetic acid, amines such as ethanolamine, glycolic acid, glyoxylic acid hydrate, mercaptans, such as mercaptopropionic acid or methyl-3-mercaptopropionate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used at from 0.001 to 3.0 wt. %, based on the weight of total monomer.

Chain transfer agents, may be used to lower the molecular weight of the formed polymer of one or more of the polymer stages and may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexylmercaptan, n-dodecyl mercaptan, and mixtures thereof. Suitable amounts of chain transfer agents may range up to 15 wt. %, preferably, from 0.1 to 5 wt. %, based on the total solids weight of all monomers used to make the given polymer.

In any emulsion polymerization, the reaction temperature should be maintained at a temperature lower than 100° C. throughout the course of the reaction, for example, at 30° C. or more, or 95° C., or 60° C. or more, or up to 90° C.

If desired, a suitable neutralizer, like sodium or potassium hydroxide, sodium carbonate, sodium bicarbonate, ammonia, triethylamine, dimethylethanolamine, aminomethylpropanol, diethylamine, triethanolamine, etc. may be added to partially or completely neutralize the acid or anhydride groups on the first stage polymer of the (i) multi-stage acrylic emulsion polymer.

Any stage of any multi-stage polymer may be crosslinked or a first stage polymer may be graftlinked to a second stage polymer using known techniques, for example, post-cure reactions, such as by forming a copolymer from a monomer having a pendant peroxide group and then activating the peroxide by heating to a temperature higher than that used in the polymerization. The activated peroxide group will promote graftlinking and crosslinking of the core/shell polymer components. In another example, crosslinking or graftlinking may be achieved post-cure by adding to the polymerization a second free-radical initiator that is stable at the initial polymerization temperature and is activated by light or at a higher temperature, followed by activating the initiator.

The (ii) polyurethanes of the present invention can be any polyurethane having the requisite Tg by DSC measured at 10° C./minute made by conventional methods from one or more diisocyanate, e.g. isophorone diisocyanate or tetramethylene diisocyanate, or a polyisocyanate, and one or more polyol. Suitable polyols for making the (ii) polyurethane of the present invention can be any having the requisite Tg (DSC), such as a polyether polyol, polycarbonate polyol, or polyester polyol having a molecular weight of 5,000 or less, or of 2,000 or less. Such polyols are preferably linear and have two hydroxyl groups, one at each end.

Suitable polyisocyanates for use in making the polyurethane of the present invention are well known in the art and include aliphatic, cycloaliphatic and/or aromatic isocyanates containing at least 2 isocyanate groups per molecule.

Suitable polyurethanes are commercially available, such as the Bayderm™ polyurethanes from Lanxess, Leverkusen, DE, or can be formed by methods conventional in the art. Polyurethane polymers are generally made by reacting an organic polyisocyanate(s) with an organic compound(s) containing isocyanate-reactive groups, particularly a polyol. The reaction may be carried out in the presence of a catalyst such as organic tin compounds and/or tertiary amines.

The (ii) polyurethanes are made into aqueous polyurethane dispersions by conventional means known in the art, and may be anionic salt functional, non-ionic or anionic polyurethane dispersions. In one example, the polyurethane dispersion may be an anionic polyurethane dispersion prepared by reacting one or more polyol with an organic compound having at least one acid group and at least two active hydrogen functionalities, and a polyisocyanate. Suitable organic compounds having at least one acid group and at least two active hydrogen functionalities (hereinafter the "organic compound") include, for example, 2,2-dimethylolacetic acid and 2,2-dimethylolpropionic acid. Examples of acid groups suitable for the organic compound include, carboxylic acid, sulfonic acid, phosphoric, phosphonic acid and the like. Preferred is the carboxylic acid group.

Suitable (ii) polyurethanes have a weight average particle size (BI-90) of from 20 to 500 nm, preferably, from 30 to 200 nm.

Suitable (ii) polyurethanes have a weight average molecular weight (Mw) of 100,000 to 3,000,000, or, preferably, from 150,000 to 1,500,000.

The (iii) polyorganosiloxane composition of the present invention may be any aqueous organosiloxane polymer or gum (aqueous composition of neat polymer) having the requisite particle size in the aqueous compositions of the present invention, such as a linear organosiloxane, e.g. a diorganosiloxane, such as, for example, polydimethylsiloxane (PDMS), or other homopolymers, copolymers, ter- or tetra-polymers. Suitable polyorganosiloxanes may be chosen from linear polymers, such as mono- or di-organosiloxanes, and may include branched polyorganosiloxanes from silsesquioxanes comprising less than 2 wt. %, based on the total weight of the polymer, of residues derived from polymerization of a silsesquioxane.

The polyorganosiloxane composition may have polyorganosiloxanes with more than one SiOH terminal group.

As aqueous compositions, the polyorganosiloxane compositions of the present invention may comprise aqueous silicon containing polymer emulsions or suspensions, such as those having one or more nonionic and/or anionic surfactants. Suitable nonionic surfactants may be chosen from alkyl polyalkoxy ethers, alkoxylated fatty alcohols, such as, preferably, a $C_{12}$-$C_{14}$ secondary alcohol ethoxylate, polyalkoxylated glycerides, polyether modified siloxanes, alkoxylated polysiloxanes and alkoxylated organic group treated silicas.

Polyorganosiloxanes and their copolymers, improve the hand of products such as leather. Polyorganosiloxanes may take the form of aqueous dispersions having solids contents of up to 85 wt. %, based on the total solids weight of the composition. Excess amounts of polyorganosiloxane cause unduly slippery or waxy finishes and products.

To form the aqueous compositions of the present invention, the materials may simply be mixed together. In use such compositions comprise from 40 to 90 wt. % of water, preferably from 60 to 90 wt. %, based on the total weight of the composition, for use in leather or paper applications. Conversely, the total solids of the aqueous compositions may range from 10 to 60 wt. %, based on the total weight of the compositions, from 10 to 40 wt. % in leather applications and from 20 to 60 wt. % in other applications.

Aqueous compositions of the present invention may take the form of waterborne dispersions, e.g. alkaline, anionic or non-ionic, and may further comprise additives, such as, for example, additional dullers, flow or wetting agents, thickeners or rheology modifiers or their mixtures, curing agents, pigments or colorants, opacifiers and extenders, antioxidants and plasticizers.

Preferably, the composition comprises no solvents, enabling good film formation in a low VOC use.

The aqueous compositions can comprise from 1 to 40 wt. %, based on the total solids weight of the composition, of one or more aqueous crosslinker, such as, for example, a polyisocyanate, polyaziridine, or aminoplast resin. Such crosslinkers may be used in amounts of 0.5 wt. % or more, and up to 15 wt. %, for example, from 1 to 10 wt. %, based on the total solids weight of the aqueous composition.

Preferably, the crosslinker is water dispersible, and is an aliphatic polymeric isocyanate.

Additional dullers may further reduce gloss via light scattering and surface roughening and may comprise known inorganic dullers, such as, for example, silica, fumed silica, alumina, silicates, (sub)carbonates, e.g. calcium carbonate, kaolin, phyllosilicates, talc, titania, zinc oxides, zirconium oxides, and alkali(ne) hydroxides having average diameters from submicron up to 30 μm; or may comprise organic dullers, such as, for example, 2-30 μm average diameter polytetrafluoroethylene, polyethylene, silicone, polyurethane, urea-formaldehyde or polyvinylidene fluoride beads. The organic dullers may also fortify film strength. Useful proportions may include up to 30 wt. %, on a solids basis, of the total amount of duller component A) plus additional dullers.

Flow agent or wetting agents may comprise any surface active compound that improves flow or wetting of surfaces, such as, for example, fluorine or silicone containing surfactants, and anionic or nonionic surfactants. Suitable amounts of flow agent or wetting agent solids may range up to 15 wt. %, preferably, up to 10 wt. %, based on the total solids weight of the aqueous composition.

Thickeners or rheology modifiers may include any additive used to thicken or to modify rheology, such as, for example, alkali soluble emulsions (ASE), hydrophobically-modified alkali soluble emulsions (HASE), hydrophobically-modified ethyleneoxide-urethane polymers (HEUR), hydrophobically-modified cellulosics, hydrophobically-modified polyacrylamides, inorganic clay materials (such as bentonite), and hydroxyethyl cellulose (HEC). Suitable amounts of thickeners or rheology modifier solids may range up to 20 wt. %, preferably, up to 3 wt. %, based on the total solids weight of the aqueous composition.

The aqueous compositions can comprise from 0 to 120 wt. %, or, preferably, up to 7 wt. %, based on the total solids weight of the composition, of one or more pigments or colorants, including iron oxides, opacifier pigments, such as, for example, titanium dioxide, and opacifying polymers.

The aqueous compositions can comprise from 0 to 7 wt. % of amorphous silica, based on the total solids weight of the composition.

In addition, plasticizers, such as dioctyladipate or dioctylphthalate, may be added in the amount of up to up to 20 wt. %, preferably, up to 2 wt. %, based on the total solids weight of the aqueous composition. Further, any of antifoaming agents, antioxidants, or UV light absorbing agents may be added in the amount of up to up to 5 wt. %, preferably, up to 1.0 wt. %, based on the total solids weight of the aqueous composition.

In addition, water for dilution may be added, such as, for example, for use at remote site to reduce the total solids of the compositions to a desired range. Accordingly, aqueous compositions may be shipped in any stable concentrated form, such as, for example, aqueous compositions comprising surfactants, flow agents or wetting agents and having solids contents, e.g., as high as 80-90 wt. %, based on the total weight of the aqueous composition.

In another aspect of the present invention, the methods of using the aqueous compositions comprise forming the aqueous composition, applying the coating composition to one or more substrate and drying, optionally, curing, the coating composition. Drying may be performed in a known manner such as, for example, air drying or heat drying at temperatures that will not damage the substrate, e.g. 150° C. or below, or 100° C. or below. The aqueous compositions may be applied to unfinished or basecoat finished leather, or to paper by curtain coater and spraying methods such as, for example, air-atomized spray, air-assisted spray, airless spray, high volume low pressure spray, and air-assisted airless spray, by roll coating or knife coating. The aqueous compositions may be applied to architectural substrates or industrial substrates, e.g. metals, wood or plastics by any known method, such as, for example, spray, brush, roll, electrostatic bell or fluid bed.

Coatings made from the aqueous compositions of the present invention may include basecoats, color coats and topcoats comprising any of clearcoats, stains or translucent coatings, pigmented color coats and paints. The coatings may have a 60° Gloss of 80 or less, or 60 or less for any substrate, or 10 or less for leather, preferably, 2 or less.

The aqueous coating compositions may be applied to various substrates, including but not limited to leather such as, for example, mineral tanned or vegetable tanned leather, including full-grain leather, buffed or corrected-grain leather, or split leather, with or without a prior treatment with an impregnating resin mixture; plastics, such as cell phones, regular phones, computer housings, remote controls; wood, natural wood, plywood, engineered wood, such as medium density fiberboard (MDF), particle board, or other lignocellulosics; gypsum board; paper, cardboard, masonite, and paperboard; woven and non-woven textiles, such as polyester roofing mats, and cotton or synthetic fiber substrates; metals, such as, for example, metallic coils; and porous surfaces, such as concrete, brick, stone, and pavement or road surfaces. In addition, the compositions may be used to make cosmetics and body treating compositions, including but not limited to skin and hair care products, moisturizing creams, sunscreen, and makeup.

EXAMPLES

In the following examples, unless otherwise indicated, all units of temperature are room temperature and all units of pressure are standard pressure (1 atm or 760 mBar).

In the following examples, the abbreviations have the following meanings:

EA=ethyl acrylate; BA=butyl acrylate; AN=acrylonitrile; AA=acrylic acid; EHA=2-ethylhexyl acrylate; AAEM=2-acetoacetylethyl methacrylate; ALMA=allyl methacrylate; DVB=divinyl benzene; HEMA=2-hydroxyethyl methacrylate; MAA=methacrylic acid; MMA=methyl methacrylate; BMA=butyl methacrylate; t-BA=tert-butyl acrylate; STY=styrene.

In the following Examples, the following materials were used:

Polyurethane Dispersion 1 (PUD 1): Primal™ Binder U-91 (The Dow Chemical Co., Midland, Mich.) is a polyurethane made using a polyester polyol having a Tg of −52.9° C. and a particle size of 61.4 nm as measured by Bi-90.

Polyurethane Dispersion 2 (PUD 2): Hauthaway™ 2501 (C.L. Hauthaway and Sons Company, Lynn, Mass.), a pud made using a polycarbonate polyol and having a Tg of −35.4° C. (product literature) and a particle size of 92.7 nm as measured by Bi-90

Polyurethane Dispersion 3 (PUD 3): Hauthaway™ 2357 (C.L. Hauthaway and Sons), a pud made using a polyether polyol and having a Tg of 43.1° C. (product literature) and a particle size of 42.6 nm as measured by Bi-90;

Polyurethane Dispersion 4: BAYDERM™ bottom CTR aqueous polyurethane dispersion (Lanxess GmbH, Leverkusen, DE, (Lanxess));

Polyurethane Dispersion 5: BAYDERM™ bottom PR aqueous polyurethane dispersion (The Dow Chemical Company, Midland, Mich., (Dow));

Polysiloxane 1: A feel additive comprising polydimethylsiloxane as a 60 wt. % aqueous dispersion having a weight average particle size (Mastersizer) of about 3 to 5 μm and a dynamic viscosity of about 30,000 Pa·s (neat, 0.01 Hz at 25° C.).

Polysiloxane 2: A feel additive comprising a polydimethylsiloxane as a 60 wt. % aqueous dispersion, having a weight average particle size (Mastersizer) of 2.5 to 4.5 μm and a median dynamic viscosity of about 45,000 Pa·s (neat, 0.01 Hz at 25° C.).

Polysiloxane 3: A feel additive comprising, a polydimethylsiloxane as a 45 wt. % aqueous dispersion having a weight average particle size (Mastersizer) of from 0.2 to 0.6 μm and dynamic viscosity of about 400,000 Pa·s (neat, 0.01 Hz at 25° C.).

Intermediate 1: Silica duller preparation for leather topcoat.

Intermediate 2 or Acrylic Duller: Acrylic emulsion polymer duller bead made using a multiple stage emulsion polymerization particle composition of 80% (96 BA/4 ALMA)//20% (96 MMA/4 EA), particle size 4 um (DCP) and solid content of 32%.

Crosslinker 1: AQUADERM XL-DI 2 Aliphatic polyisocyanate crosslinker, (Lanxess);

Crosslinker 2: AQUADERM XL-80 Aliphatic polyisocyanate crosslinker, (Lanxess);

Flow Agent: Aquaderm™ Fluid H polydimethylsiloxane Flow agent (Lanxess);

HYDRHOLAC™ UD-4 polymer bound duller (Dow);

Black Pigment dispersion 1: EUDERM™ BLACK BN carbon black Pigment dispersion (Lanxess);

Black Pigment Dispersion 2: EUDERM™ X-Black B carbon black pigment dispersion 2 (Lanxess);

HEUR (Hydrophobically modified Ethylene Oxide Urethane) rheology Modifier: Acrysol™ RM-1020 rheology modifier (Dow);

Soft anti-tack agent and filler: [1]EUDERM™ Nappa Soft S2 casein and triglyceride aqueous preparation (Lanxess);

Matting agent: EUDERM™ Duller SN-2 silicic acid aqueous preparation (Lanxess);

Acrylic Emulsion Polymer Binder: PRIMAL™ SB 300 Acrylic Emulsion polymer (Dow).

In all of the test methods, below, unless otherwise indicated, leather was finished in one of two ways: Leather was embossed on the indicated basecoat using a crushed goat plate at 100° C./300 bar pressure for 10 seconds. The leather was staked (placed on a stake) 2 times prior to applying top coat. Alternatively, leather was smooth finished over basecoat using a Model N Finiflex smooth roll (Koch Tanning Machinery Co., Waukesha, Wis.) at a temperature of 120° C.

Standard Test Methods

Cold Flex: Cold flex testing was conducted on smooth finished leather that was top coated with the indicated composition and allowed to cure for 3 days. A six station, low temperature flexometer (Giuliani corporation, model G6FN, Torino Italy) was used for this determination. Conditions employed were −10° C. for 30,000 flexing cycles and testing was conducted on leather that was cut into 3.84 cm (1.5")×6.4 cm (2.5") pieces. The leather was evaluated for damage to the topcoat after flexing and visually assessed by stereoscope and rated using a visual rating scale of 1-5 which represents substantial topcoat cracking to no topcoat damage. A higher rating represents improved performance. Generally an acceptable result is 3 or higher.

Flexibility Determination:

A 3.8 cm×6.5 cm swatch of leather finished with the indicated composition using a was positioned on a Bally Flexometer™ device (model 2397, Otto Specht Company, Stuttgart, DE). The leather was flexed for 100,000 cycles at ambient temperature. After flexing, the leather was visually evaluated for cracking and generation of "white crazing" in the flexing area. For the evaluation the sample was examined under a 10× sterio-scope. The results are recorded and rated using a visual rating scale of 1-5 which represents substantial topcoat cracking to no topcoat damage. A higher rating represents improved performance but generally an acceptable result is 3 or higher.

Color Determination:

Color of the leather finished with the indicated composition was determined using a color spectrophotometer (X-Rite™ 8400 Sphere spectrophotometer, X-Rite Incorporated, Grand Rapids, Mich.). CIE L*a*b* values were determined using a D65 light source at a 10 degree standard observer (gloss excluded).

Wet Rub Fastness:

Wet rub fastness was determined on finished leather that was top coated with the indicated composition and allowed to cure for 24 hours prior to testing. A three station Veslic™ Tester (Schap Corporation, Spring Lake, Mich.) equipped with Veslic™ pads (Ar N° 701 pads, Swissatest corporation, St Gallen, CH) that were soaked with 1 gram of water was used for testing leather that was cut into 12.8 cm (5")×2.56 cm (1") pieces. One kilogram of weight was applied to the pad and 2000 rub cycles were applied to the leather. The pads were visually evaluated for pigment transfer and assessed by using a grey scale rating of 1 to 5 which represents substantial to no pigment transferred from the leather to the pad. A higher rating represents improved performance. Generally an acceptable rating is 4 or higher.

Soft-Feel Assessment:

Finished leather articles were manually handled to determine the degree of softness to touch. A relative rating of 1-5 was assessed on the degree of softness provided. A rating of 1 represents leather that has a relative hard surface feeling and a rating of 5 represents leather that has a relatively very soft feeling at the surface. An acceptable rating is 3 or higher.

Gakushin Method:

To measure abrasion resistance of a leather topcoat, the conventional method described in Improvements in Gakushin Wear Testing Through Laboratory Automation (Journal of the American Leather Chemists Association, Volume 108, Issue 6, (2013), pp. 200-209) was employed. In this method, a higher value represents improved abrasion performance.

Synthesis: Synthesis of Acrylic Multi-Stage Polymer Emulsion Polymer 1

First Stage:

1025 g of deionized water was added into 5 L round bottom flask (reactor) fitted with a stirrer, condenser, temperature probe and a nitrogen flush.

Reactor and added water were degassed for 30 min. A monomer emulsion was prepared in a separate jar by addition of 203.4 g deionized water, 31.6 g sodium lauryl sulfate (28% solution), 31.8 g of sodium salt of branched alkylbenzene sulfonic acid (22% solution), 411 g of butyl acrylate, 411 g of 2-ethylhexyl acrylate, and 16.8 g of acrylic acid. At 40° C., 25% of the monomer emulsion was pumped into the reactor followed by charging each of 7 mg of $FeSO_4.7H_2O$ in 10 g deionized water, 0.2 g of ammonium persulfate in 15 g of deionized water and 0.4 g of sodium hydrosulfite in 15 g of deionized water. Polymerization was allowed to proceed for 10 minutes of exotherm. After polymerization was complete, the rest of the monomer emulsion was pumped into the reactor at 48° C. and the pump lines were rinsed with 80 g of deionized water followed by addition of 0.6 g of ammonium persulfate in 15 g of deionized water and 1.1 g of sodium hydrosulfite in 25 g of deionized water. Polymerization was allowed to proceed for 10 minutes of exotherm. After polymerization was complete, 0.5 g of t-butyl hydroperoxide in 15 g of deionized water and 0.4 g of sodium formaldehyde sulfoxylate in 15 g of deionized water were charged separately to the reactor.

Second Stage:

At 64° C., 191.5 g of methyl methacrylate and 18.2 g of 2-hydroxyethyl methacrylate were mixed and pumped to the reactor containing the first stage polymer; the pump lines lines were rinsed with 25 g of deionized water, then 1.0 g of t-butyl hydroperoxide in 35 g of deionized water and 0.8 g of sodium formaldehyde sulfoxylate in 25 g of deionized water were separately charged to the reactor. Polymerization was allowed to proceed for 5 minutes of exotherm. After polymerization was complete, residual monomers were reacted by pumping separately 1.6 g of t-butyl hydroperoxide in 50 g of deionized water and 1.4 g of Bruggolite™ FF6 (disodium salts of 2-hydroxy-2-sulfinatoacetic acid and 2-hydroxy-2-sulfonatoacetic acid ~70% w/w and sodium sulfite ~30% w/w, Brüggemann Chemical U.S., Inc., Newtown Square, Pa.) in 50 g of deionized water to the reactor over a 30 minute period.

After the reactor was allowed to cool to 35° C., the emulsion polymer was neutralized by pumping a mixture of 76.3 g of deionized water, 10.7 g sodium lauryl sulfate (28% solution), and 11.1 g of triethyl amine into the reactor over 45 minutes. A final dilution of 60 g of deionized water was added to the reactor.

The resulting emulsion polymer was filtered over a 45 micron screen and the filtrate was analyzed to give a total solids of 37.1 wt. %, a pH of 7.8 and a weight average particle size of 111.1 nm (BI-90).

Synthesis of Comparative Emulsion Polymer 2A:

The emulsion polymer 2 was synthesized as disclosed in Example 1, above, except monomer amounts were adjusted according to the ratios described in Table 3A, below.

Synthesis of Emulsion Polymer Comparatives 1 and 2:

The emulsion polymers Comparatives 1 and 2 were synthesized as disclosed in Example 1, above, except monomer amounts were adjusted according to the ratios described in Table 3A, below.

Synthesis of Emulsion Polymer Comparative 3:

The emulsion polymer was prepared according to description in Example of European Patent no. EP1274794B1, to Biver et al., to give a multi-stage emulsion polymer of 28 MMA/55.9 BA/0.81 Butanediol Acrylate/0.43 diallyl maleate//13.8 MMA/1.01 MAA in which the latter stage is the outer stage.

Formulations for making coatings were formed from the indicated compositions, as follows:

A basecoat formulation for treating leather was prepared by sequentially adding the materials listed in Table 1, below, and mixed using a lab top, three blade mixer. The basecoat formulation was applied to the indicated leather substrate by spray application to a final add-on of 4-5 dry grams/square foot (40 to 55 g/m$^2$).

TABLE 1

Basecoat Formulation

| Material | grams |
| --- | --- |
| Water | 204 |
| Soft anti-tack agent and filler | 136 |
| Matting agent | 260 |
| Acrylic Emulsion Polymer Binder | 340 |
| Polyurethane dispersion 4 | 170 |
| Polyurethane dispersion 5 | 425 |
| Black Pigment dispersion 2 | 255 |
| HEUR Rheology Modifier | 6 |
| Total | 1797.7 |

A silica duller dispersion was prepared using a high shear dispersator by adding in order the materials listed in Table 2, below. Silica was added slowly over about 1.5 hours to obtain the dispersion.

TABLE 2

Intermediate 1: Silica Duller Preparation For Leather Topcoat Grind preparation

| Material | Grams |
| --- | --- |
| Water | 1516.2 |
| [8] Polymeric dispersant | 130.3 |
| [9] Amino silane | 9.5 |
| [10] Inorganic silica duller | 202.1 |
| [11] Defoamer | 1.5 |
| [12] Nonionic surfactant | 65.4 |
| [11] Defoamer | 1.5 |
| water | 77.4 |
| HEUR Rheology Modifier | 12.9 |
| total grind | 2016.8 |

[8] TAMOL™ 731a dispersant (Dow);
[9] Dynasylan™ 1505 (Evonik Industries);
[10] ACEMATT TS-100 (Evonik Industries);
[11] Surfynol™ 104BC (Air Products);
[12] Tergitol™ 15-S-5 (Dow);

TABLE 3A

Acrylic Polymer Compositions for Topcoats

| Emulsion Polymer | BA | EHA | AA | HEMA | HEMA | MMA | Tg[1] (° C.) |
| --- | --- | --- | --- | --- | --- | --- | --- |
| | 1st Stage (80% of total) | | | | 2nd Stage (20% of Total) | | 1st Stage; 2nd Stage |
| 1 | 49.00 | 49.00 | 2.00 | — | 8.68 | 91.32 | −43.1; 117.3 |
| Comparative 1 | 96.50 | — | 3.50 | — | — | 100.00 | −31.9; 124.5 |
| Comparative 2A | 45.75 | 45.75 | 3.50 | 5.00 | — | 100.00 | −37.1; 122.3 |
| Comparative 2 | 49.00 | 49.00 | 2.00 | — | 17.36 | 82.64 | −46.9; 113.4 |
| Comparative 3 | | | | | | | −4.6; 137.9 |

[1] DMA.

TABLE 3B

Topcoat Formulations (amounts shown in grams)

| Formulation Example | Comp 1A | Example 1 | Example 2 | Example 3 | Comp. 3A | Comp. 4A | Comp. 5A |
| --- | --- | --- | --- | --- | --- | --- | --- |
| Emulsion Polymer | 1 | 1 | 1 | 1 | Comp 3 | Comp 3 | Comp 3 |
| Water | 20.0 | 20.0 | 20.0 | 20.0 | 20.0 | 20.0 | 20.0 |
| Intermediate 1 | 40.7 | 40.7 | 40.7 | 40.7 | 40.7 | 40.7 | 40.7 |
| Acrylic Duller | 23.0 | 23.0 | 23.0 | 23.0 | 23.0 | 23.0 | 23.0 |
| Flow Agent | 2.0 | 2.0 | 2.0 | 2.0 | 2.0 | 2.0 | 2.0 |
| Polysiloxane 2 | 14.0 | 14.0 | 14.0 | 14.0 | 14.0 | 14.0 | 14.0 |
| Black Pigment dispersion 1 | 1 | 1.0 | 1.0 | 1.0 | 1.0 | 1.0 | 1.0 |
| HEUR rheology modifier | 0.8 | 0.8 | 0.8 | 0.8 | 0.8 | 0.8 | 0.8 |
| Extra water | 11.7 | 13.7 | 9.2 | 14.1 | 13.4 | 8.8 | 13.7 |
| Emulsion polymer | 66.7 | 33.3 | 33.3 | 33.3 | 33.7 | 33.7 | 33.7 |
| Polyurethane Dispersion 1 | | 31.5 | | | 31.5 | | |
| Polyurethane Dispersion 3 | | | 36.1 | | | 36.1 | |
| Polyurethane Dispersion 2 | | | | 31.2 | | | 31.2 |

TABLE 3B-continued

Topcoat Formulations (amounts shown in grams)

| Formulation Example | Comp 1A | Example 1 | Example 2 | Example 3 | Comp. 3A | Comp. 4A | Comp. 5A |
|---|---|---|---|---|---|---|---|
| HEUR rheology modifier | 2.1 | 1.3 | 1.3 | 1.2 | 1.3 | 1.2 | 1.2 |
| Crosslinker 1 | 20.0 | 20 | 20 | 20 | 20 | 20 | 20 |
| Total | 202.0 | 201.3 | 201.3 | 201.2 | 201.3 | 201.2 | 201.2 |

TABLE 3C

More Topcoat Formulations (amounts shown in grams)

| Formulation Example | Comp 6A | Comp 4 | Comp 7A | Comp 5 |
|---|---|---|---|---|
| Emulsion Polymer | Comp 1 | Comp 2A | Comp 2 | Comp 2A |
| Water | 36.6 | 36.6 | 36.6 | 73.3 |
| Flow Agent | 2.4 | 2.4 | 2.4 | 4.9 |
| Black Pigment dispersion 2 | 7.3 | 7.3 | 7.3 | 14.7 |
| HYDRHOLAC ™ UD-4 | 104.9 | 104.9 | 104.9 | 210.2 |
| Emulsion Polymer | 48.8 | 48.8 | 48.8 | 97.8 |
| Polysiloxane 1 | 17.1 | 17.1 | 17.1 | 34.2 |
| HEUR rheology modifier | 3 | 2.2 | 2.2 | 4.4 |
| Amount premix transferred | 180 | 180 | 180 | 420 |
| Crosslinker 2 | 20 | 20 | 20 | 46.7 |

TABLE 3D

Topcoat Formulations with Duller Beads (amounts shown in grams)

| Formulation Example | 1 | Comp. 8A | Comp. 9A |
|---|---|---|---|
| Emulsion Polymer | 1 | 1 | 1 |
| Water | 20.0 | 24.8 | 24.8 |
| Intermediate 1 | 40.7 | 40.7 | 40.7 |
| Intermediate 2 acrylic Duller | 23.0 | 23.0 | 23.0 |
| Flow Agent | 2.0 | 2.0 | 2.0 |
| Polysiloxane 2 | 14.0 | | |
| Polysiloxane 3 (comparative) | | | 18.7 |
| Black Pigment dispersion 1 | 1.0 | 1.0 | 1.0 |
| HEUR rheology modifier | 0.8 | 0.8 | 0.8 |
| Extra water | 13.7 | | |
| Emulsion Polymer | 33.3 | 33.3 | 33.3 |
| Polyurethane Dispersion 1 | 31.5 | 31.5 | 31.5 |
| HEUR rheology modifier | 1.3 | 1.2 | 1.2 |
| Crosslinker 1 | 20 | 20 | 20 |
| Total | 201.3 | 178.2 | 197.0 |

TABLE 3E

Topcoat Formulations with Dullers and Siloxanes (amounts shown in grams)

| Formulation Example | 1 | Comp form. 10A | 6 |
|---|---|---|---|
| Emulsion polymer | 1 | 1 | 1 |
| Water | 20.0 | 24.8 | 24.8 |
| Intermediate 1 | 40.7 | 40.7 | 40.7 |
| Intermediate 2 acrylic Duller | 23.0 | | 11.5 |
| Flow Agent | 2.0 | 2.0 | 2.0 |
| Polysiloxane 2 | 14.0 | 7.0 | 7.0 |
| Black Pigment dispersion 1 | 1.0 | 1.0 | 1.0 |
| HEUR rheology modifier | 0.8 | 0.8 | 0.8 |
| Extra water | 13.7 | | |
| Emulsion Polymer | 33.3 | 33.3 | 33.3 |
| Polyurethane Dispersion 1 | 31.5 | 31.5 | 31.5 |
| HEUR rheology modifier | 1.3 | 1.2 | 1.2 |
| Crosslinker 1 | 20 | 20 | 20 |
| Total | 201.3 | 162.3 | 173.8 |

Topcoat formulations were prepared by sequentially adding the materials listed in Tables 3B-3E, above, to a container and mixing using a lab top, three blade mixer. After mixing, the topcoats were filtered through a 125 μm paint strainer and sprayed over the basecoat described in Table 1, above. The final add-on for topcoat was 16.1-26.9 dry grams per square meter of leather. Performance of the topcoat formulations is presented in Tables 4A to 4D, below.

TABLE 4A

Results

| Formulation Example | Comp. 1A | 1 | 2 | 3 | Comp 3A | Comp. 4A | Comp. 5A |
|---|---|---|---|---|---|---|---|
| Wet rub fastness | 2.5 | 5 | 4 | 4.5 | 5 | 1 | 2 |
| Cold flex | 2 | 4 | 2 | 4 | 1 | 2 | 1 |

Table 4A, above, shows that a combination of the inventive Emulsion Polymer 1 with polyurethane dispersions in Examples 1 to 3 provide significantly improved wet rub fastness performance than comparative Example 1A that contains no polyurethane dispersion. Also a combination of the inventive Emulsion Polymer 1 with polyurethane dispersions in Examples 1 to 3 provide a better overall balance of wet rub fastness and cold flex performance than comparative Emulsion Polymer 3 combined with polyurethane dispersions in Comparative Examples 3A, 4A and 5A.

TABLE 4B

Results

| Formulation Example | Comp 6A | 4 | Comp 7A | Comp 5 |
|---|---|---|---|---|
| Cold Flex | 1 | 4 | 2.5 | 1 |

Table 4B, above, shows that the inventive combination of the inventive multi-stage acrylic emulsion polymer Emulsion Polymer 1 with a polyurethane dispersion provides in Example 4 significantly improved cold flex performance when comparative to formulations of Comparative Emulsion Polymers 1 or 2 combined with a polyurethane dispersion in Comparative Examples 6A and 7A. Thus, by reducing the copolymerized carboxylic acid monomer level from 3.5 wt. % to 2.0 wt. % in the first stage polymer and including 8.7 wt. % of copolymerized hydroxyl functional monomer in the second stage, as in Emulsion Polymer 1, the cold flex is optimized along with the early flex while maintaining the wear resistance of the topcoat. See Example 1 and compare comp Ex. 6A and 7A. Further, when including 17.4% of the hydroxyl functional monomer in the second stage of Comparative Emulsion Polymer 2_in Comparative Example 7A, one does not observe cold flex. Not shown in any Table, one also does not observe wet rub advantages when using Comparative Emulation Polymer 2. Emulsion Polymer 2A having more than 3 wt. % of copolymerized ethylenically unsaturated carboxylic acid or salt group containing monomer exhibits less desirable cold flex than compositions comprising multi-stage acrylic emulsion polymers made from the preferred amount of less than 3 wt. % of copolymerized ethylenically unsaturated carboxylic acid or salt group containing monomer, such as Emulsion Polymer 1.

TABLE 4C

| | Results | | |
|---|---|---|---|
| Formulation Example | 1 | Comp. 8A | Comp. 9A |
| Wet rub fastness | 5 | 1 | 4 |
| Gakushin (conventional) | 6667 | | 4733 |

Table 4C, above, shows that formulations containing a combination of the inventive multi-stage acrylic emulsion polymer Emulsion Polymer 1 with a polyurethane dispersion and 4.2% polyorganosiloxane composition of particle size 3 to 4 um in Example 1 provides dramatically better wet rub performance and Gakushin wear performance than a formulation containing Emulsion Polymer 1 containing 4.5% of a polyorganosiloxane composition of a weight average particle size >1 um.

TABLE 4D

| | Results | |
|---|---|---|
| Formulation Example | 1 | Comp. 10A 6 |
| Soft-feel | 5 | 2 4 |

Table 4D, above, shows that formulations containing a combination of the inventive multi-stage acrylic emulsion polymer Emulsion Polymer 1 with a polyurethane dispersion and from 2.1 to 3.7 wt. % of acrylic duller bead particles and 2.2 to 4.2 wt. % polysiloxane composition having a weight average particle size 3 to 4 μm, as in Examples 1 and 6 provides dramatically better soft-feel than a comparative Example 10A that contains the same Emulsion Polymer 1 but has no acrylic duller bead.

We claim:

1. An aqueous composition comprising:
(i) from 10 to 50 wt. %, based on the total solids weight of the composition, of a multi-stage acrylic emulsion polymer having 70 to 90 wt. %, based on the total solids weight of the polymer, of a first stage polymer of from 0.5 to 3 wt. %, based on the total weight of monomers used to make the first stage polymer, of a copolymerized carboxylic acid or salt group containing monomer, and having 10 to 30 wt. %, based on the total solids weight of the multi-stage acrylic emulsion polymer, of a second stage polymer of from 3 to 15 wt. %, based on the total weight of monomers used to make the second stage polymer, of a copolymerized hydroxyl group containing monomer, the first stage polymer having a glass transition temperature (Tg) by dynamic mechanical analysis (DMA) of less than −10° C. and the second stage polymer having a Tg (DMA) of greater than 80° C.; and
(ii) from 25 to 75 wt. %, based on the total solids weight of the multi-stage acrylic polymer, of a polyurethane having a polymeric Tg determined by differential scanning calorimetry (DSC), scanning from a temperature of −90° C. to 150° C. at a heating rate of 20° C./min, of −20 to −70° C.

2. The aqueous composition as claimed in claim 1, wherein the (i) multi-stage acrylic emulsion polymer comprises as the first stage polymer a polymer of from 1 to 3 wt. %, based on the total weight of monomers used to make the first stage polymer, of a copolymerized carboxylic acid or salt group containing monomer.

3. The aqueous composition as claimed in claim 1, wherein the (i) multi-stage acrylic emulsion polymer comprises as the second stage polymer a polymer of from 3 to 12 wt. %, based on the total weight of monomers used to make the second stage polymer, of a copolymerized hydroxyl group containing monomer.

4. The aqueous composition as claimed in claim 1, wherein the (i) multi-stage acrylic emulsion polymer comprises copolymerized hydroxyethyl methacrylate as the copolymerized hydroxyl group containing monomer.

5. The aqueous composition as claimed in claim 1, wherein the second stage polymer of the (i) multi-stage acrylic emulsion polymer has a Tg (DMA) of greater than 100° C.

6. The aqueous composition as claimed in claim 1, wherein the first stage polymer of the (i) multi-stage acrylic emulsion polymer is substantially free of copolymerized hydroxyl group containing monomers and of copolymerized diethylenically or polyethylenically unsaturated vinyl monomers.

7. The aqueous composition as claimed in claim 1, wherein the second stage polymer of the (i) multi-stage acrylic emulsion polymer is substantially free of copolymerized carboxylic acid or salt group containing monomers and is substantially free of copolymerized diethylenically or polyethylenically unsaturated vinyl monomers.

8. The aqueous composition as claimed in claim 1, wherein the first stage polymer of the (i) multi-stage acrylic emulsion polymer has a Tg (DMA) that is at least 100° C. less than the Tg (DMA) of the second stage polymer.

9. The aqueous composition as claimed in claim 1, wherein at least one polyurethane in the (ii) polyurethane dispersion comprises a condensate of one or more polyester polyol or polyether polyol or polycarbonate polyol with a diisocyanate or a polyisocyanate.

10. The aqueous composition as claimed in claim 1, further comprising (iii) from 1 to 50 wt. % of a polyorganosiloxane composition, based on the total solids weight of the aqueous composition, the polyorganosiloxane composition having a polyorganosiloxane with a weight average particle size of from 1.0 to 10 μm.

11. A coated article comprising leather upholstery having thereon a coating of the aqueous compositions as in claim 1.

12. The aqueous composition as claimed in claim 1, further comprising from 1 to 40 wt. %, based on the total solids weight of the composition, of one or more crosslinker comprising a polyisocyanate, a polyaziridine, or aminoplast resin.

13. The aqueous composition as claimed in claim 1, further comprising 5 to 20 wt. %, based on the total solids weight of the composition, of one or more multi-stage acrylic copolymeric dullers.

14. The aqueous composition as claimed in claim 13, further comprising an additional inorganic or organic duller.

* * * * *